Aug. 11, 1964    G. E. LIGHTNER ETAL    3,144,492
FOAMED RESIN PROCESS
Filed Dec. 19, 1960    4 Sheets-Sheet 1
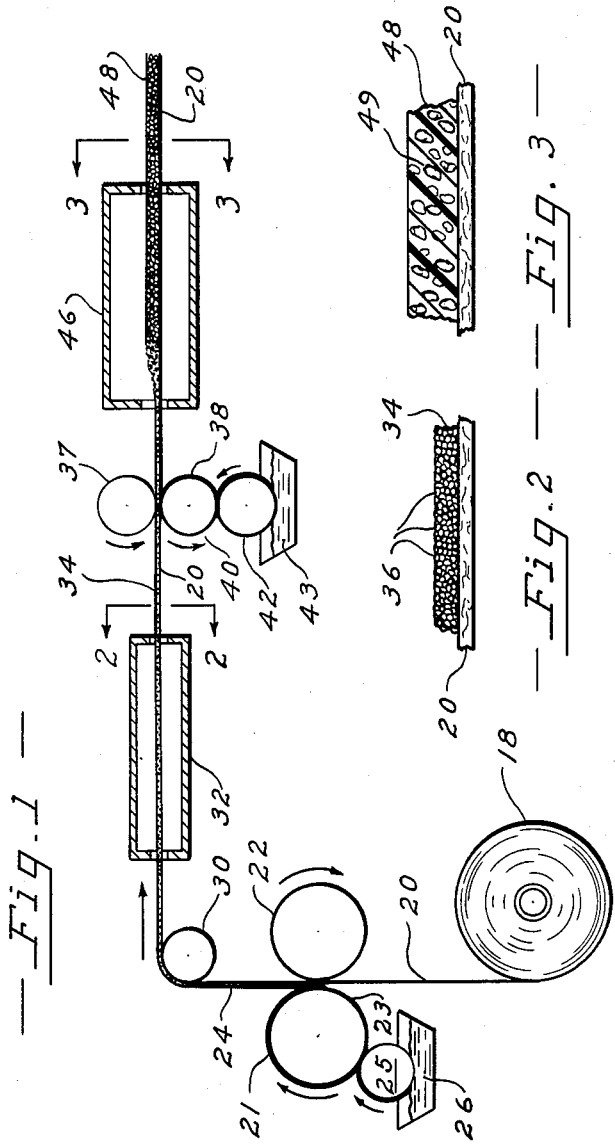
GENE E. LIGHTNER
KENNETH R. NICKOLLS  *INVENTORS.*
BY *Richard L. Kelly*
ATTORNEY.

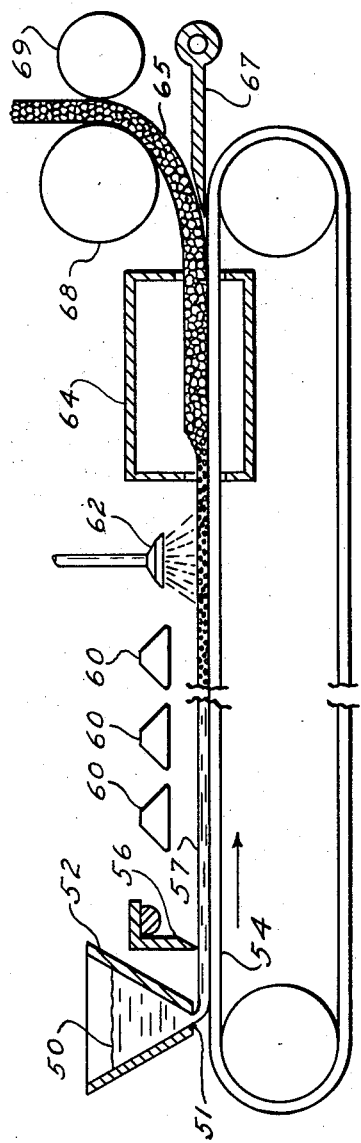

Aug. 11, 1964   G. E. LIGHTNER ETAL   3,144,492
FOAMED RESIN PROCESS
Filed Dec. 19, 1960   4 Sheets-Sheet 3

STEP I — DIP MOLD IN SALT SOLUTION, e.g., CALCIUM CHLORIDE.

STEP II — DIP MOLD IN POLYMER LATEX, e.g., POLYSTYRENE LATEX.

STEP III — DRY POLYMER FILM DEPOSITED ON MOLD.

STEP IV — DIP MOLD IN VAPORIZABLE FOAMING AGENT, e.g., PENTANE-ACETONE MIXTURE.

STEP V — HEAT MOLD TO ABOVE SOFTENING TEMPERATURE OF POLYMER TO FOAM THE POLYMER.

STEP VI — REMOVE FOAMED POLYMER ARTICLE FROM MOLD.

— Fig. 5 —

GENE E. LIGHTNER
KENNETH R. NICKOLLS   INVENTORS.

BY *Richard X. Kelly*
ATTORNEY.

Aug. 11, 1964 G. E. LIGHTNER ETAL 3,144,492
FOAMED RESIN PROCESS

Filed Dec. 19, 1960 4 Sheets-Sheet 4

GENE E. LIGHTNER
KENNETH R. NICKOLLS INVENTORS.

BY *Richard L. Kelly*

ATTORNEY.

United States Patent Office

3,144,492
Patented Aug. 11, 1964

3,144,492
FOAMED RESIN PROCESS
Gene E. Lightner, Moscow, Idaho, and Kenneth R. Nickolls, Wilbraham, Mass., assignors to Monsanto Company, St. Louis, Mo., a corporation of Delaware
Filed Dec. 19, 1960, Ser. No. 76,870
7 Claims. (Cl. 264—47)

The present invention relates to novel foamable thermoplastic resin composition and to methods for preparing same. The invention further relates to a novel process for preparing foamed thermoplastic reins and to the foamed thermoplastic resins prepared thereby.

Foamed thermoplastic resins such as foamed polystyrene are low-density materials having high strength to weight ratios and excellent insulating properties. Many foamed thermoplastic resin articles are currently prepared by either molding or extruding foamable thermoplastic resin compositions which consist of thermoplastic resin particles having dispersed therethrough a vaporizable foaming agent (e.g., pentane) which has an atmospheric boiling point below the softening temperature of the thermoplastic resin. Usually, the foamable thermolpastic resin composition is manufactured at a site removed from the site of manufacture of the foamed resin article. The preliminary step of preparing the foamable thermoplastic resin composition poses certain problems for the art. First, it is difficult and costly to prepare thermoplastic polymers having the desired quantity of the vaporizable foaming agent dispersed throughout the polymer. Second, the handling and storage of such foamable compositions frequently presents a fire hazard as the vaporizable foaming agent is usually highly inflammable. Third, in storage, the foamable compositions frequently lose a portion of their vaporizable foaming agent content and this loss can lead to erratic results when the compositions are molded or extruded.

In addition to the difficulties set forth in the paragraph above, molding and extrusion processes for preparing foamed thermoplastic resins have a heavy capital requirement per unit productive capacity of foamed resin.

It is an object of this invention is to provide novel foamable thermoplastic resin compositions and methods for preparing same.

Another object of this invention is to provide a novel process for preparing foamed thermoplastic resins.

A further object of the invention is to provide a novel process for preparing foamed thermoplastic resins, which process largely avoids the problems associated with previously known processes for preparing foamed thermoplastic resins.

Other objects and advantages of the invention will be apparent from the following detailed description thereof when read in conjunction with the drawings in which FIG. 1 is a side elevation partially in section of an apparatus for preparing a supported sheet of a foamed thermoplastic resin;

FIG. 2 is a cross-sectional view taken through line 2—2 of FIG. 1;

FIG. 3 is a cross-sectional view taken through line 3—3 of FIG. 1;

FIG. 4 is a side elevation partially in section of an apparatus for preparing an unsupported sheet of a foamed thermoplastic resin;

FIG. 5 is a flow sheet describing yet another method for preparing foamed thermoplastic resin articles.

Figure 6:
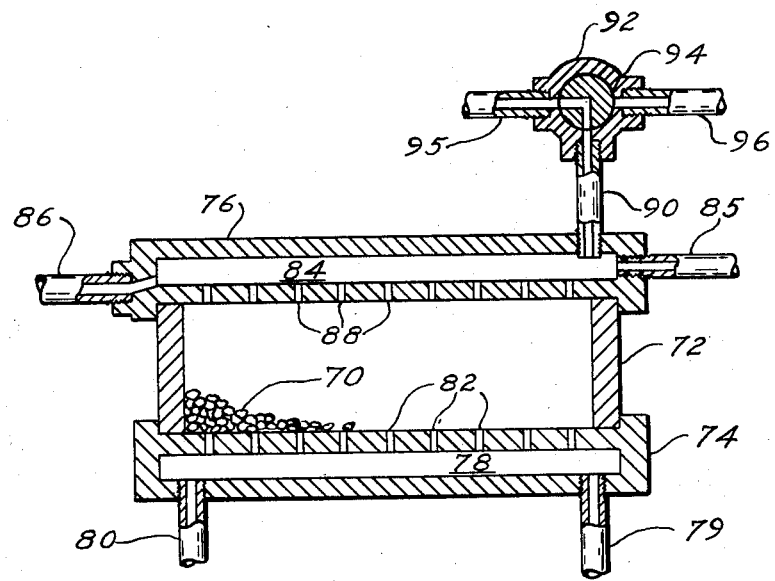
FIG. 6 is a side elevation partially in section of an apparatus for preparing a foamed thermoplastic resin by a molding technique.

It has been discovered that free-flowing foamable thermoplastic resin compositions can be prepared in remarkably short periods of time by uniformly coating 100 parts by weight of dry free-flowing finely-divided thermoplastic resin particles with about 3–10 parts by weight of a vaporizable foaming agent at a temperature from about $-10$ to about $50°$ C. and maintaining the vaporizable foaming agent in contact with the thermoplastic resin particles for a short period of time sufficient for the vaporizable foaming agent to diffuse into and become integral with the thermoplastic resin particles. A period of 10 minutes is usually sufficient for this purpose. It also has been discovered that foamed thermoplastic resins of unusual properties can be prepared in economically attractive short processing cycles by (1) contacting thermoplastic resin particles having a critical fine particle size with a vaporizable foaming agent for a short period of time of up to a maximum of about 10 minutes and (2) substantially immediately thereafter heating the resulting composition to above the softening temperature of the thermoplastic resin. The thermoplastic resin particles employed in these processes have an average particle size of less than 100 microns and preferably less than 2 microns. Several novel methods for preparing foamed thermoplastic resins in the form of molded articles, supported and unsupported sheets and the like also have been discovered, all of which methods include the step of contacting finely-divided thermoplastic resin particles with a vaporizable foaming agent for a short period of time and substantially immediately thereafter heating the resulting composition to above the softening temperature of the thermoplastic resin.

The following examples are set forth to illustrate more clearly the principle and practice of the invention to those skilled in the art. Where parts or quantities are mentioned, they are parts or quantities by weight.

EXAMPLE I

Part A

A glass jar is filled ⅓ full with 100 parts of free-flowing polystyrene particles obtained by spray-drying a latex of polystyrene. The spray-dried particles are essentially spherical in shape and have diameters of the order of 2–5 microns. The spray-dried particles are actually friable agglomerates of a number of essentially spherical polystyrene resin particles which have diameters of the order of 0.05–0.3 micron. There are added to the spray-dried polystyrene particles 8 parts of a 90/10 mixture of pentane and acetone. The jar is sealed and rolled for 5 minutes on a paint roller at room temperature. At the end of this time, the polystyrene particles are substantially homogeneous and free-flowing.

Part B

Immediately after being prepared 0.3 lb. of the composition of Part A above is placed in a porous mold of the type illustrated in the drawing of U.S. 2,744,291, the interior volume of said mold being 0.1 ft.$^3$. The sealed mold is placed boiling water for 5 minutes and is then cooled to room temperature. The foamed article thus obtained has a density of 3 lbs./ft.$^3$ and is quite resilient.

EXAMPLE II

Twenty-five grams of a polystyrene latex containing 40% resin solids is placed in a shallow pan. The polystyrene latex is then dried at 25° C. in a vacuum oven. The resulting friable sheet is porous and weighs 10 grams. The average diameter of the polymer particles making up the friable sheet is of the order of 2–5 microns. One gram of a 90/10 mixture of pentane and acetone is poured uniformly over the surface of the friable polymer sheet and permitted to stand for 5 minutes. Thereafter, the impregnated sheet is placed in a steam chest for 3 minutes. The resulting product is a resilient foamed polystyrene sheet having a density of about 1.5 lbs./ft.$^3$. The cells of the foamed polystyrene sheet have diameters falling within the range of about 0.001–0.006 in.

EXAMPLE III

A one square foot sheet of #133 BRW double bleached paper (paper cup stock) is coated with a 0.002 inch film of a 40% solids polystyrene latex. The polystyrene particles in this latex have diameters of about 0.05 micron. The coated paper is placed in a forced circulation hot air oven and dried at 105° C. for 45 seconds. Subsequent examination shows that substantially no fusion of the polystyrene particles has occurred and that the coating of dried polystyrene solids measures about 0.001 inch in thickness. The coated sheet of paper is then placed, paper side down, for about 8 seconds in a shallow pan containing pentane (later duplication of this step shows the pentane pickup to be about 8% by weight, based upon the weight of the resin). The sheet is then placed in a forced circulation hot air oven maintained at about 245° C. for 5 seconds. A foamed polystyrene sheet measuring an average of 0.015 inch in thickness is obtained and is securely affixed to the sheet of paper. The density of the cellular structure is about 3.3 pounds per cubic foot.

EXAMPLE IV

Example III is repeated using a stainless steel plate as the support in lieu of the paper support employed in Example III. The resultant foamed polystyrene sheet is easily stripped from the steel plate.

EXAMPLE V

Example III is repeated using an aqueous slurry of polystyrene particles (having an average particle size of about 75 microns) in place of the polystyrene latex employed therein. In addition, a 90/10 mixture of pentane and acetone is employed in lieu of pentane alone. Comparable results are obtained.

EXAMPLE VI

A roll of #133 BRW double bleached paper (paper cup stock) measuring 11 inches in width is advanced at the rate of 20 feet per minute through the following sequence of steps: The paper is first passed through a reverse roll coater where an 0.002 inch film of a 40% solids polystyrene latex is coated on the upper surface. The polystyrene particles in this latex have diameters of about 0.05 micron. Continuing on, the coated sheet passes through a 16-foot long forced circulation hot air drier maintained at 105° C. and thence to a short section where it is fan cooled to below about 40° C. The coated sheet is then passed over a reversing roll such that the coated side is then underneath. Next, the coated sheet is passed in contact with a coating roll where a 90/10 mixture of pentane and acetone is applied at the rate of about 0.05 pounds per minute (or about 45% by weight, based upon the weight of the resin) to the paper side of the coated sheet, across its entire width. About 2.5 seconds later, the sheet passes into a 2-foot long forced circulation hot air drier maintained at 250° C. The product is a continuous foamed polystyrene sheet securely affixed to the sheet of paper. The density of the foamed polystyrene is about 4 pounds per cubic foot.

FIG. 1 illustrates a method that can be employed to prepare a laminated structure consisting of a foamed thermoplastic resin sheet that is supported upon a paper sheet. Paper sheet 20 is drawn from a supply roll 18 and first passes through the nip of rolls 21 and 22. Roll 21 carries on its surface a film 23 of a thermoplastic resin latex, e.g., a polystyrene latex, and deposits upon the surface of paper sheet 20 a latex film 24. The film 23 on roll 21 is continuously replenished by making contact with roll 25 which dips into reservoir 26 of the thermoplastic resin latex.

After passing over roll 30, the latex coated paper sheet 20 passes through oven 32 wherein all of the water originally present in the latex film is evaporated. Upon leaving oven 32, paper 20 is coated with a dry, friable, non-fused polymer film 34. As best seen in FIG. 2, film 34 is composed of a series of discrete resin particles 36—36. The resin coated paper sheet 20 next passes through the nip of rolls 37 and 38. Roll 38 carries on its surface a film 40 of a liquid vaporizable foaming agent such as pentane or a pentane-acetone mixture which is first absorbed by paper 20 and thereafter diffuses into the resin particles 36—36 of resin film 34. The film 40 of the foaming agent carried on roll 38 is continuously replenished by making contact with a roll 42 which dips into reservoir 43 of the liquid vaporizable foaming agent. The assembly of paper sheet 20 and the foaming agent impregnated resin sheet 34 next passes through steam chest 46 wherein the thermoplastic resin particles are foamed to form a voluminous homogeneous foamed thermoplastic resin sheet 48. As is best seen in FIG. 3, sheet 48 contains a multitude of cells 49—49 which are predominated ellipsoids whose major axes are perpendicular to the plane of paper sheet 20.

FIG. 4 illustrates a method for preparing an unsupported sheet of a foamed thermoplastic resin. A thermoplastic resin latex 50, e.g., a polyvinyl chloride latex, is discharged from orifice 51 of supply box 52 onto an endless belt 54. Endless belt 54 passes under a doctor knife 56 to provide a latex film 57 of constant thickness. Latex film 57 passes under a bank of infrared heating elements 60—60 which remove all of the water originally present in the latex film. After passing under the infrared heaters, the film 57 is non-continuous and is made up of a series of non-fused discrete thermoplastic resin particles. The film 57 next passes under a spray head 62 which uniformly distributes a liquid foaming agent, e.g., dichlorodifluoromethane, over the surface of film 57. The foaming agent impregnated film 57 next passes through steam chest 64 in which the resin particles foam to form a voluminous homogeneous foamed thermoplastic resin sheet 65. Foamed thermoplastic resin sheet 65 is stripped from endless belt 54 by means of a stripping knife 67 and is delivered to a wind-up roll (not shown) by means of drive rolls 68 and 69.

FIG. 5 is a flow sheet which illustrates the manner in which foamed thermoplastic resin articles can be prepared by a latex dipping technique. In Step I, a suitable ceramic mold such as a finger mold is dipped into an aqueous electrolyte solution such as a calcium chloride solution. In Step II, the electrolyte coated mold is dipped into a thermoplastic resin latex such as a polystyrene latex to coagulate a non-continuous, non-fused polymer film on the mold surface. In Step III, the resin coated mold is dried to remove any water which adheres to the coagulated polymer film. In Step IV, the resin film is impregnated with a foaming agent by dipping the mold into a liquid foaming agent such as an 80/20 pentane-acetone mixture. In Step V, the foaming agent impregnated thermoplastic resin is foamed by heating the mold to above the softening temperature of the thermoplastic resin. Finally, in Step VI, the molded foamed thermoplastic resin article is removed from the mold on which it is prepared.

FIG. 6 illustrates an apparatus and method that can be employed to prepare a molded foamed thermoplastic resin article. In this method the thermoplastic resin is foamed with a gaseous foaming agent such as butane. The mold consists of a frame 72, a bottom plate 74 and a top plate 76. Bottom plate 74 is provided with a cored cavity 78 which communicates with a steam inlet 79 and a steam outlet 80. Both the steam inlet 79 and steam outlet 80 can be sealed or opened by valve means not shown. The face of bottom plate 76 is provided with a series of small openings 82—82. In a similar manner, upper plate 76 is provided with a cord cavity 84 which communicates with a steam inlet 85 and a steam outlet 86, both of which can be sealed or opened by valve means not shown. The face of top plate 76 is provided with a series of small openings 88—88. Cored cavity 84 of top plate 76 also communicates with a two-way valve 92 by means of line 90. Valve 92 is of conventional construction and is provided with a stop cock 94 which is adapted to provide communication between line 90 and either line 95 or line 96.

In operation, the mold is charged with a quantity of finely-divided thermoplastic resin 70, e.g., polystyrene particles having average diameters of about 50 microns. The quantity of resin charged is sufficient to completely fill the mold when the resin is foamed to its calculated and desired ultimate density. Steam lines 79, 80, 85 and 86 are closed to seal the mold. Valve 92 is turned to the position shown in the drawing and butane from a high pressure (about 30 p.s.i.g.) tank not shown is charged to the mold through lines 95 and 90. The sealed mold is permitted to stand for 1 minute at room temperature to permit the butane to diffuse into the resin particles. Stop cock 94 of valve 92 is then turned 90° C. in a counterclockwise direction from the position shown in the drawing to vent excess butane from the mold through lines 90 and 96. Valve 92 is then closed and steam lines 79, 80, 85 and 86 are opened to admit steam (e.g., at a pressure of 30 p.s.i.g.) into the mold. Steam is maintained in the mold for 2 minutes and thereafter the mold is cooled and the foamed thermoplastic resin article is removed therefrom.

The present invention, in its broadest aspect, comprises preparing free-flowing foamable thermoplastic resin compositions by uniformly coating 100 parts by weight of a finely-divided thermoplastic resin (having a critical maximum average particle size subsequently described) with about 3–10 parts of a vaporizable foaming agent and maintaining the vaporizable foaming agent in contact with the thermoplastic resin particles for a short period of time sufficient to permit the foaming agent to diffuse into the resin particles. The invention also comprises preparing novel foamed thermoplastic resin articles by (1) contacting thermoplastic resin particles having a critical fine particle size with a vaporizable foaming agent for a short period of time of up to a maximum of about 10 minutes and (2) substantially immediately thereafter heating the resulting composition to above the softening temperature of the thermoplastic resin.

The thermoplastic resin particles employed in the present invention have an average particle size of less than 100 microns and preferably less than 2 microns. As used herein, "particle size" is understood to mean the largest dimension of the particle. The average particle size is determined by adding the largest dimension of $n$ resin particles and dividing this sum by $n$. A sufficiently large number of particles should be measured so that the calculated particle size is representative of the entire lot of the resin particles.

The thermoplastic resin employed in the present invention may be essentially any thermoplastic resin having a glass transition temperature of at least 50° C. As is known, the glass transition temperature has a well-established meaning in the art and can be readily determined by many well-known procedures, e.g., by the Nielsen method reported in the S.P.E. Journal at vol. 16, No. 5, May 1960. Examples of the thermoplastic resins that may be employed include cellulose ethers and esters, e.g., ethyl cellulose, cellulose acetate, cellulose acetate-butyrate; homopolymers and the interpolymers of monomeric compounds containing the vinylidene grouping $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, methacrylic acid, acrylic acid and methacrylic acid esters of alcohols containing 1–18 carbon atoms, e.g., methyl and ethyl methacrylate, acrylamide, acrylonitrile; vinyl aromatic compounds, e.g., styrene, vinyl toluene, p-ethylstyrene, 2,4-dimethylstyrene, o-chlorostyrene, 2,5-dichlorostyrene, and vinyl naphthalene; and interpolymers of vinylidene monomers of the above type with alpha, beta-unsaturated polycarboxylic acids and derivatives thereof, e.g., maleic anhydride, diethyl maleate, dibutyl fumarate, etc. It is feasible and sometimes desirable to employ blends of two or more thermoplastic resins, such as, e.g., blends of polystyrene with rubbery diene polymers such as natural rubber, butadiene-styrene interpolymers, butadiene-acrylonitrile interpolymers and the like. Styrene graft copolymers prepared by polymerizing monomeric styrene in the presence of a rubbery diene polymer also may be employed advantageously.

The vaporizable foaming agents employed in the practice of this invention are nonreactive organic compounds which have at most a slight solvent action on the thermoplastic resin and have atmospheric boiling points in the range of from about —10 to about 80° C. These include, for example, aliphatic hydrocarbons such as butane, pentane, isopentane, hexane, isohexane, cyclohexane, etc.; halogenated aliphatic hydrocarbons such as ethyl chloride, propyl chloride, isopropyl bromide, butyl chloride, and particularly perchlorofluorocarbons such as dichlorodifluoromethane, monochlorotrifluoromethane, trichloromonofluoromethane, 1,1,2,2-tetrachloro-1,2-difluoroethane, and the corresponding perchlorofluorocarbons set forth in U.S. 2,848,428 at column 3, lines 30–41; aliphatic amines such as ethylamine, propylamine, isopropylamine, dimethylamine, etc.; aliphatic ethers such as diethyl ether, diisopropyl ether, methyl ethyl ether, ethyl isopropyl ether, etc.; acetaldehyde, etc. For a listing of other vaporizable foaming agents that can be employed see U.S. 2,681,321. It is feasible and in some cases desirable to employ mixtures consisting predominantly of a vaporizable foaming agent of the type described above with minor amounts of an organic compound having a solvent action on the thermoplastic resin. Typically, such mixtures will contain 70–98 weight percent of the vaporizable foaming agent and, correspondingly, 30–2 weight percent of the organic compound having a solvent action on the thermoplastic resin. Typical of the organic compounds having a solvent action on the thermoplastic resin which can be used in admixture with a vaporizable foaming agent are acetone, methylene chloride, styrene monomer, benzene, xylene, carbontetrachloride, chloroform, etc. Preferably, the organic compound should have an atmospheric boiling point not higher than about 80° C.

It is most surprising that foamable thermoplastic resin compositions and foamed thermoplastic resins can be prepared in the short processing cycles provided by the method of the present invention. Up to the present time it has always been considered necessary to employ lengthy periods to incorporate the vaporizable foaming agent in the thermoplastic resin. Example V of U.S. 2,681,321 notes that polystyrene was permitted to stand in contact with an aliphatic hydrocarbon foaming agent for up to 30 days to incorporate the foaming agent in the thermoplastic resin. U.S. 2,857,339 is concerned with a method for shortening the period required to incorporate an aliphatic hydrocarbon foaming agent in a thermoplastic resin, but even with this improved process a period of approximately 24 hours was required to incorporate the foaming agent into the polymer particles.

The differences in the length of the processing cycles obtained with the present invention as compared with the length of the processing cycles obtained with previously known processes suggest that the present invention may operate upon somewhat different scientific principles. It is possible that the foaming agent may be simply physically adsorbed on the surface of the finely-divided resin particles until the resin particles are heated. At that time the vaporizable foaming agent may diffuse to the resin particles and then vaporize when the resin particles are heated to above their softening temperature. Regardless of the precise mode of operation, it is a demonstrable fact that foamed thermoplastic resin articles can be prepared in much shorter processing cycles by the method of the present invention than by any other process known to the present date.

In addition to the economical short processing cycles associated with the present invention, the resulting foamed thermoplastic resins produced thereby have very desirable physical characteristics. In particular, the foamed thermoplastic resins prepared by the process of this invention have unusually small cell sizes in which the majority of the cells of the foamed resin have cell diameters of less than about 0.01". See Example II. It is well-recognized in the art that many of the physical properties of foamed thermoplastic resins are improved as the cells thereof are reduced in size. See U.S. 2,911,381.

Various processing techniques can be employed to prepare foamed thermoplastic resins by the method of this invention. For example, after the thermoplastic resin particles have been contacted with the vaporizable foaming agent, the resulting foamable resin compositions can be heated in sealed molds to prepare molded articles.

In a preferred embodiment of the invention, the finely-divided thermoplastic resin particles are fabricated to approximate the form of the ultimately desired article before the resin particles are contacted with the vaporizable foaming agent. Thus, if a foamed thermoplastic resin sheet is ultimately desired, the finely-divided thermoplastic resin particles are laid down upon a suitable support as a thin, non-fused film or sheet which is subsequently contacted with a vaporizable foaming agent and then heated to above the softening temperature of the thermoplastic resin to prepare the foamed thermoplastic resin sheet. This embodiment of the invention can be employed to prepare either supported or unsupported foamed thermoplastic resin sheets. Where an unsupported foamed thermoplastic resin sheet is ultimately desired, the finely-divided thermoplastic resin particles are initially deposited upon a smooth impermeable support such as a polished metal support, a wax coated rubber or paper surface or the like. After the foamed thermoplastic resin sheet has been prepared it can be easily stripped from the support. Where a supported sheet is ultimately desired, the finely-divided thermoplastic resin particles are initially deposited upon a porous support sheet such as unglazed paper, woven or non-woven fabrics and the like. In the subsequent processing, the thermoplastic resin particles penetrate into the interstices of the support sheet and become intermingled therewith so that the final foamed thermoplastic resin sheet clings tenaciously to the support sheet. In preparing such supported sheets it is desirable to use as the foaming agent a mixture of the vaporizable foaming agent and a solvent for the resin. The solvent appears to provide a firmer bond between the foamed resin and the support.

The supported and unsupported foamed thermoplastic resin sheets described in the paragraph above are preferably prepared by initially forming the non-fused film of finely-divided thermoplastic resin particles from a thermoplastic resin latex. In this method, an aqueous latex is deposited upon the support in the form of a substantially smooth film. The water is then substantially completely removed from the film under conditions such that little or no fusion of the thermoplastic resin particles occurs. For example, the water can be removed from the film by vacuum evaporation at temperatures below the fusion temperature of the thermoplastic resin particles employed. Alternatively, the water can be vaporized at temperatures above the fusion temperature of the thermoplastic resin provided that the film is removed from the heat source shortly after all of the water is removed from the film. Thereafter, the non-fused film of the thermoplastic resin particles is contacted with the vaporizable foaming agent and foamed by the methods previously described.

The foamed thermoplastic resin films and sheets prepared by the methods described in the two paragraphs immediately above have structures which differ significantly from foamed thermoplastic resin films and sheets that are prepared by alternate methods e.g., as by blow extrusion techniques. Specifically, the cells of the foamed thermoplastic resin prepared by the above method are not spherical, but rather tend to be elongated ellipsoids in which the major axes thereof lie in a plane perpendicular to the support upon which the sheet or film is prepared.

Foamed thermoplastic resin articles of complex shapes can be prepared by a four step process which comprises (1) depositing a film from a thermoplastic resin latex upon a mold, (2) drying the latex film, (3) contacting the dried latex film with a vaporizable foaming agent, and (4) foaming the resulting film by heating the thermoplastic resin to above its softening temperature. It will be recognized that the above process employs techniques closely akin to those employed in the dipped rubber latex art and many of these techniques can be readily adapted to the process of the present invention.

The above descriptions and particularly the examples and the drawings are set forth for purposes of illustration only. Many variations and modificaitons thereof will be apparent to those skilled in the art and can be made without departing from the spirit and scope of the invention herein described.

This application is a continuation in part of our co-pending application Serial No. 41,478, filed July 8, 1960.

What is claimed is:

1. A process for preparing a foamed thermoplastic resin structure which comprises depositing a thin film of an aqueous dispersion of a finely-divided thermoplastic resin upon a support, removing substantially all of the water therefrom to provide a non-continuous film of said thermoplastic resin particles upon the support, contacting said thermoplastic resin particles with a vaporizable foaming agent for a peirod of time of up to about 10 minutes and substantially immediately thereafter heating said film of thermoplastic resin particles to a temperature above the softening temperature of the thermoplastic resin; said thermoplastic resin particles having a glass transition temperature of at least about 50° C. and an average particle size of less than 100 microns; said vaporizable foaming agent being selected from the group consisting of (a) a non-reactive organic compound which has at most a slight solvent action on the thermoplastic resin and has an atmospheric boiling point in the range of from about −10 to about 80° C. and (b) mixtures consisting predominantly of (a) with minor amounts of an organic compound having a solvent action on the thermoplastic resin.

2. The process of claim 1 which comprises depositing an 0.002 inch film of an aqueous dispersion of a finely-divided thermoplastic resin upon a support.

3. The process of claim 1 wherein the finely-divided thermoplastic resin is a thermoplastic styrene polymer having an average particle size of less than 2 microns.

4. The process of claim 1 wherein the fibrous support sheet is paper.

5. The process of claim 1 wherein the thermoplastic resin particles are contacted with 3–10 parts of a vaporizable foaming agent per 100 parts of the thermoplastic resin particles.

6. A paper-foamed thermoplastic resin laminate prepared by the process of claim 4.

7. The process of claim 1 wherein the support has an impermeable surface and the sheet of foamed thermoplastic resin is removed from the support.

References Cited in the file of this patent

UNITED STATES PATENTS

| | | |
|---|---|---|
| 2,385,920 | Jenkins | Oct. 2, 1945 |
| 2,442,940 | Standinger et al. | June 8, 1948 |
| 2,530,362 | Morris | Nov. 14, 1950 |
| 2,681,321 | Stastny et al. | June 15, 1954 |
| 2,707,805 | Smith et al. | May 10, 1955 |
| 2,744,291 | Stastny et al. | May 8, 1956 |
| 2,837,440 | Boivin | June 3, 1958 |
| 2,880,466 | Gunderman et al. | Apr. 7, 1959 |

FOREIGN PATENTS

| | | |
|---|---|---|
| 1,180,049 | France | June 1, 1959 |